Feb. 27, 1962  R. PYZEL  3,022,989
HYDRAULIC CEMENT PROCESS
Filed April 7, 1954
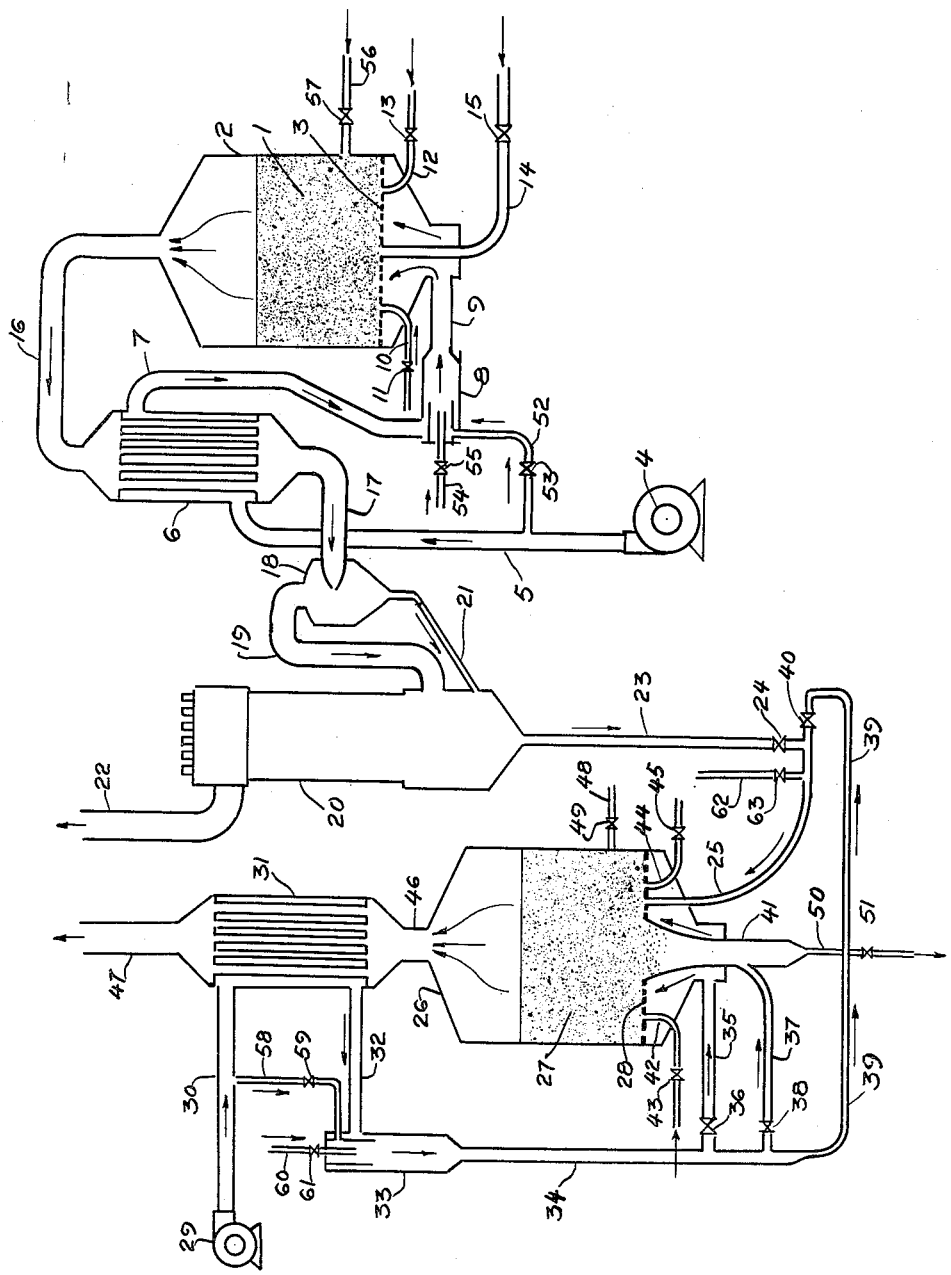
INVENTOR
*Robert Pyzel*
BY
*Moses, Nolte, Crews & Beery*
ATTORNEY 3,022,989
HYDRAULIC CEMENT PROCESS
Robert Pyzel, Piedmont, Calif., assignor, by mesne assignments, to Union Commerce Bank, trustee, a corporation of Ohio
Filed Apr. 7, 1954, Ser. No. 421,572
6 Claims. (Cl. 263—53)

My invention relates to improvements in the art of manufacturing hydraulic cements. Among the particular objectives of my invention are (1) to provide the means for manufacturing cements more economically and (2) to provide the means for producing cements of better quality.

Hydraulic cements may be manufactured from raw materials containing carbonates and/or sulphates, such as calcium carbonate and calcium sulphate, and compounds of silica, alumina, iron oxide, and the like. To convert these materials into hydraulic cement requires that the calcium compounds are converted to calcium oxide by removal of carbon dioxide and/or sulphur dioxide and oxygen, and that thereafter the calcium oxide is reacted with the silica, alumina and iron oxide materials to form compounds consisting of combinations such as di-calcium-silicate, tri-calcium-silicate, tri-calcium-aluminate and tetra-calcium-alumino-ferrite.

One of the features of my invention is that the conversion of the calcium compounds into calcium oxide takes place in an "inert" mass of relatively coarse fluidized solid particles which is maintained in a pre-treating reaction zone at temperatures below 2200° F., the feed materials containing calcium compounds being treated within this fluidized mass in finely powdered form.

Another feature of my invention is that the cement forming reactions (in which calcium oxide is combined with other oxides) take place in a mass of fluidized solid particles which is maintained in a cement forming reaction zone at temperatures in excess of 2200° F. and in which a controlled and limited amount of cement forming reaction occurs relative to the total mass of fluidized material, and in which the formation of "clinkers" or large aggregates of reactant materials is avoided while yet the reacting materials are nevertheless permitted to "flux" in order to form the desired cement product.

Another feature of my invention is that the cement forming reactions may be carried out at much longer reaction time factors and at more uniform and, if desired, higher reaction temperatures than those possible in the kilns now used in the cement industry.

Another feature of my invention is that alkali materials which may be present in the feed materials charged to the process, are removed from the cement forming reaction zone as sodium and potassium oxide vapors, and are discharged from the process without contacting the feed materials. Thus the build-up of an alkali recycle within the process (such as occurs in rotary kilns and other processes now used in the cement industry) is prevented, and the alkali concentration in the cement forming reaction zone is kept at the minimum possible depending only on the original alkali content of the feed materials. Because of this mode of operation the cement product produced by my process contains only a trace of alkalies, if any.

The combination of these features makes it possible to manufacture cements more economically and of more uniform and better quality, and it provides the means for manufacturing cement of modified or different chemical composition compared to those which can not be produced commercially, and which may have superior or special qualities desirable in various types of construction employing cement.

In accordance with my invention, the feed materials, consisting for instance of carbonates or sulphates and oxide materials, are first ground to a fine powder in conventional equipment (for instance a powder fine enough so that the maximum particle diameters are less than 100 microns), and the fine powder so obtained is then charged into the pre-treating reaction zone of my process.

The pre-treating reaction zone consists of a mass of relatively coarse solid particles (for instance of larger than 500 microns particle diameter) contained in a suitable vessel and maintained in a fluidized state by upward flow of air or other oxygen containing gases through the mass. The coarse particles consist of materials which are inert to the reactions taking place in the pre-treating reaction zone, such as sand or fused alumina particles, or particles of cement product material—the latter constituting the preferred material. This fluidized mass of coarse "inert" particles is heated to and maintained at pre-treating reaction temperatures by injection of fuel into the mass which by combustion with the oxygen of the fluidizing gases (and the oxygen released by the conversion of sulphates, if these are present in the feed materials) generates the necessary heat.

The finely powdered feed materials are charged into this fluidized mass, and will rapidly disperse throughout the mass and be subjected to pretreating conditions. The upward velocity of gas flow through the mass is adjusted so that the finely powdered pre-treated feed materials are continuously carried out of the mass in suspension in the gases discharging from the top of the mass, while at the same time these gas velocities are insufficient to carry in suspension the coarser "inert" particles.

Some attrition of the coarser "inert" particles may occur as the operation continues, and the dust resulting from such attrition will be carried out of the fluidized mass together with the pre-treated feed materials suspended in the discharging gas stream, and this dust will thus become a part of the pre-treated materials charged to the cement forming reaction zone. It is for this reason that cement product material is the preferred "inert" material to be used in the pre-treating reaction zone, as above mentioned, but the contamination may be so slight that this may not be a matter of consequence.

The finely powdered particles of feed material charged into the pre-treating reaction zone will be heated almost instantaneously to the reaction temperature prevailing in this zone, and will be maintained at this temperature while retained in the turbulent fluidized mass of coarse "inert" particles, until they escape from the fluidized mass in suspension in the discharging gases. As a result of the passage of the feed powder through the pre-treating fluidized mass, the carbonates will be converted as indicated by the equation—

$$CaCO_3 \rightarrow CaO + CO_2$$

and the sulphates, in the presence of the carbon entering the fluidized mass in the fuel, will be converted as indicated by the equation—

$$2CaSO_4 + C \rightarrow 2CaO + 2SO_2 + CO_2$$

which probably represents a combination of the following two equations—

(a) $\quad 2CaSO_4 \rightarrow 2CaO + 2SO_2 + 2O$ (b) $\quad\quad 2O + C \rightarrow CO_2$ It should be noted that the relative size of the pre-treating section of my process may be greatly reduced if it is designed to obtain a conversion of the carbonates and/or sulphates which falls somewhat short of a 100 percent conversion, and this is permissible inasmuch as any remaining unconverted carbonates and/or sulphates will be converted in the subsequent cement forming reaction zone. However, the conversion should preferably be accomplished as much as reasonably possible in the pre-treating reaction zone in order to obtain the highest overall operating economy of the process.

The pre-treated feed materials carried out of the pre-treating reaction zone in suspension in the gas stream leaving this zone, are separated from the gas stream in suitable equipment such as cyclone separators or electrical precipitators, and the materials so collected are charged into the cement forming reaction zone.

The cement forming reaction zone of my process consists of a mass of relatively coarse solid particles contained in a suitable vessel and maintained in a fluidized state by upward flow of air or other oxygen containing gases through the mass. The fluidized mass is heated to and maintained at cement forming reaction temperatures by injection of fuel into the mass which by combustion with the oxygen of the fluidizing gases (and the oxygen released by conversion of sulphates which may still be present in the pre-treated feed materials) generates the necessary heat.

The particles contained in the cement forming fluidized mass consist almost entirely of cement product material with only a limited amount of reaction of cement forming material taking place in the fluidized mass, mostly on the surface of said cement product particles. The mode of operation of this fluidized mass and the purpose of this operation are outlined in the following paragraphs.

It is necessary to control the molten phase which develops during the course of the cement forming reactions. This molten phase has heretofore been the principal obstacle to successfully carrying out the cement forming reactions in a fluidized solids operation, for it causes a "stickiness" which agglomerates the fluidized solid particles into large aggregates and thereby renders the continued operation of the fluidized mass impossible—the fluidized mass rapidly became a stationary body of agglomerated particles.

This molten phase (which is characteristic of the cement forming reactions, and which is helpful in promoting the progress of these reactions) is caused only by certain intermediate reaction materials, that is, neither the feed materials nor the final cement product can melt at the cement forming reaction temperatures.

In the operation of the cement forming fluidized mass of my process the molten phase serves its useful purpose while at the same time it is held in check to a point where agglomeration of the fluidized mass is prevented. This is accomplished by establishing at the start of the operation, and maintaining during continued operation, a fluidized mass consisting predominantly of relatively coarse particles of cement product material (for instance of particle diameters ranging from 500 microns upward), and charging into this "stable" mass the pre-treated finely powdered feed materials. Initially, reaction sets in as some of the fine feed particles cling to the surfaces of the much larger product particles and a small amount of molten phase develops on these surfaces causing a degree of "stickiness" which thereafter is sufficient to cause all the fine feed particles to be attached to the surfaces of the larger product particles and thereby the cement forming reactions are caused to proceed on these surfaces, causing a gradual growing of the product particles as layer upon layer of new product material is created in this manner. But the amount of reaction taking place on the product particles is limited and controlled, in the manner described below, and hence the amount of molten phase occurring on these surfaces is also limited and controlled. The net effect is that there is sufficient "stickiness" to cause adherence of the fine feed particles to the coarser product particles, but yet the degree of "stickiness" is not sufficient to cause the larger product particles themselves to become attached to one another, and agglomeration of the fluidized mass is thereby prevented.

To obtain and control the desired degree of "stickiness" in the fluidized mass, it is necessary to select the proper charging rate of finely powdered feed materials relative to the total mass of coarse fluidized product particles maintained in the cement forming reaction zone, and this selection of charging rate must be made in relation to the reaction velocities which, in turn, are primarily determined by the temperature level at which the fluidized mass is operated.

It will be apparent that, in the operation of the cement forming reaction zone disclosed herein, the smaller the feed rate relative to the total fluidized mass, the smaller will be the amount of reacting materials dispersed over the surfaces of the product particles in the fluidized mass, and therefore the smaller will be the concentration of molten phase, and hence the "stickiness," which develops on these surfaces.

But, in addition to the relative feed rate, the operating temperature will also strongly influence the concentration of the molten phase, the effect being that the higher the temperature the smaller the concentration of the molten phase on the surfaces of the product particles in the fluidized mass. This may appear contradictory since higher temperatures are usually associated with more melting. In the case of the cement forming reactions, however, the molten phase is not a direct function of the temperature, but is due to the formation of eutectic mixtures which melt at any temperature within the temperature range in which the cement forming reactions take place. It is therefore the relative amount of eutectic mixtures, not the reaction temperature as such, which determines the concentration of the molten phase.

The eutectic mixtures are formed only by certain intermediate reaction materials, and one may therefore look upon the cement forming reactions as taking place in two steps—(1) reactions of feed materials into intermediate materials, with some of the latter forming eutectic mixtures which melt, and (2) reactions of intermediate materials into final product, with a disappearance of the molten phase because the eutectic forming intermediate materials are reacted into "stable" final product. The concentration of eutectic forming intermediate materials in this system of reactions will depend on the relative velocities of the reactions involved in the first step and those involved in the second step. It is known that the reactions making up the second step are the more difficult and require higher temperatures to initiate. In fact, if the reaction temperature is not high enough, it is even possible that the first step will take place while the second step does not, with reactions proceeding only to the formation of intermediate materials, and hence a maximum opportunity for the formation of eutectics which will melt even at this lower reaction temperature. Raising the temperature will bring the reactions of the second step into play, causing conversion of the intermediate materials into final product, and thereby causing a decrease in the concentration of the intermediate, eutectic forming materials. Thus the more the reaction velocities of the second step are speeded up relative to the reaction velocities of the first step, by raising the reaction temperature, the lower will be the amount of intermediate materials, which in turn lowers the amount of eutectic with a resulting lower concentration of molten phase.

Furthermore, as the reaction temperature is raised, all the reaction velocities are speeded up generally, so that at higher temperatures the overall reaction of feed materials into final product will be more rapid. Consequently, at any given feed rate relative to the total mass of material in the reaction zone, the amount of reacting material present in the total fluidized mass will be reduced with increasing operating temperatures. The molten phase will therefore also be reduced with increasing temperatures—for this reason as well as, and in addition to, the reason outlined in the preceding paragraph.

The above factors are interrelated, and it is clear that, in the operation of the reaction zone disclosed herein, low feed rates relative to total fluidized mass plus high temperatures lead to low concentration of molten material and hence a low degree of "stickiness," while high feed rates and lower temperatures lead to higher concentrations of the molten phase, hence to greater "stickiness." Thus the desired degree of "stickiness" may be obtained and controlled by the proper selection of operating temperature and feed rate in relation to total mass in the cement forming reaction zone.

In the operation of the cement forming reaction zone disclosed herein, the particles in the fluidized mass will continually grow in size as layer upon layer of new product material is created on the surfaces of the particles, and as a consequence the largest particles (which will have the greatest mass relative to surface) will contain the highest percentage of finished product material, with possibly only a trace of partially reacted material on their surfaces. It is therefore desirable to withdraw from the fluidized mass only the largest particles to be discharged as final product of the operation, since in this manner the final product will contain the minimum, if any, unreacted or partially reacted material. However, when the cement forming reaction zone is operated with very low feed charging rates relative to the fluidized mass contained in this zone, and the feed materials are charged as a very fine powder, while at the same time the fluidized mass is maintained at high reaction temperatures (in other words, when the operating conditions are such as to bring about a minimum concentration of reacting materials in the total fluidized mass), it may then not be necessary to selectively withdraw only the largest particles as final product inasmuch as the average composition of the fluidized mass may, during operation of the cement forming reaction zone in this manner, contain so low a percentage of unreacted or partially reacted material that this average composition will meet the desired product specifications. In such case it will be satisfactory to simply withdraw an adequate quantity from the fluidized mass as final product of the process without a specifically controlled segregation of particles sizes.

Since, in the operation of this cement forming reaction zone, the particles in the fluidized mass will continually grow in size, there is a tendency toward increasingly coarser particles sizes in the fluidized mass as the operation continues. Even when only the coarsest particles are selectively withdrawn as final product, there will nevertheless be a disappearance of the smaller product particle sizes. Therefore, in order to control and maintain the most satisfactory particle size distribution in the fluidized mass, it may be desirable to charge into the mass, in addition to the finely powdered feed materials, controlled quantities of product material of somewhat smaller particle size than the average particle size of the fluidized mass. These smaller product particles will serve as nuclei for growing into larger particles, and by this procedure the particle size distribution in the fluidized mass may be maintained as desired.

Any alkali materials which are present in the feed materials charged to the process are converted to sodium and potassium oxide in the cement forming reaction zone, and these oxides will be vaporized at the operating temperatures prevailing in this zone. Such oxide vapors are discharged from the fluidized mass and leave this reaction zone in the discharging gas stream. In the process disclosed herein, these discharged gases are purposely "not" brought in contact with the feed materials being processed in the pretreating section (such as might be done to exchange heat from these gases to the feed materials) in order to avoid condensation of the alkali oxides in the feed materials. Therefore, a build-up of alkali concentration in the cement forming reaction zone, such as occurs in the kilns and other processes now used in the cement industry, is prevented. In my process the concentration of alkalies in the cement forming fluidized mass is held to the minimum possible depending only on the original alkali content of the feed materials, and as a consequence the cement product produced in this manner contains only a trace of alkalies, if any.

The operation of my process may be further described with reference to the accompanying drawing which diagrammatically illustrates an apparatus suitable for carrying out my invention. It will be apparent to those skilled in the art that alternative equipment to that shown on the drawing may be employed without departing from the essence of my invention. The particular apparatus shown therefore constitutes a preferred form suitable for the purpose but is not intended as a limitation upon the full scope of my invention.

Referring to the drawing, the pretreating fluidized mass 1, consisting of coarse "inert" particles, is contained in reactor 2 and supported on grid 3. Reactor 2 may consist of a steel shell internally lined with firebrick and externally insulated. Air or other oxygen containing gases are charged into the fluidized mass 1 by means of compressor 4, the gases flowing from compressor 4 through line 5, then through heat exchanger 6, then through line 7, through auxiliary burner 8, then through line 9 into the bottom of reactor 2 and into the fluidized mass through grid 3. Suitable quantities of fuel (gas, oil, powdered coal, or the like) are charged into the fluidized mass 1 through lines 10 and 12 which are provided with valves 11 and 13. Combustion of the fuel within the fluidized mass 1 generates the heat necessary for the pretreating reactions and to maintain the desired pretreating temperature level.

Feed materials, ground to a fine powder in equipment not shown, are charged into the fluidized mass 1 through line 14 and valve 15, and will rapidly disperse throughout the fluidized mass and be heated to the operating temperature of the mass. Reaction of carbonates and/or sulphates will take place as above described.

The combustion and other gases generated are discharged from the top of the fluidized mass 1, carrying the fine particles or pretreated feed materials in suspension, and flow from reactor 2 through line 16, then through heat exchanger 6, then through line 17 into cyclone separator 18. A large part of the particles carried by the gases will be collected in separator 18. The gases, still carrying some pretreated particles, flow from separator 18 through line 19 into the bottom of electrical precipitator 20. The particles collected in separator 18 also flow into the bottom of precipitator 20 through line 21. Precipitator 20 collects substantially all the particles carried by the gas stream leaving separator 18. The gases, essentially free of solid particles, are discharged from the top of precipitator 20 through stack 22.

The pretreated cement forming materials collected by separator 18 and precipitator 20 flow through line 23 and valve 24 into line 25 through which they are charged into the cement forming reactor 26.

The cement forming fluidized mass 27 is contained in reactor 26, and supported on grid 28. Reactor 26 may consist of a steel shell internally lined with firebrick and externally insulated. Air or other oxygen containing gases are charged into the fluidized mass 27 by means of compressor 29, flowing from compressor 29 through line 30, then through heat exchanger 31, then through auxiliary burner 33, then through line 34 which divides into lines 35, 37 and 39 which are provided respectively with flow control valves 36, 38 and 40. The gases flowing through line 35 enter the fluidized mass through grid 28, those flowing through line 37 enter the fluidized mass through the product discharge cone 41, while those flowing through line 39 enter the fluidized mass through line 25, carrying the pretreated feed powder along in suspension. Suitable quantities of fuel (gas, oil powdered coal, or the like) are charged into the fluidized mass through lines 42 and 44 provided respectively with control valves 43 and 45. Combustion of the fuel within the fluidized mass generates the heat necessary to maintain the mass at cement forming reaction temperatures. The combustion and other gases discharging from the top of the fluidized mass flow through line 46, through heat exchanger 31, and are discharged from the process through stack 47.

Recycled product particles for controlling the particle size distribution of the fluidized mass 27 may be charged through line 48 and valve 49.

Product particles are withdrawn from the fluidized mass through the product discharge cone 41 and are discharged from the process through line 50 and valve 51. The product discharge cone 41 operates in the following manner. The gases charged into the cone from line 37 flow upward through the zone at a decreasing linear velocity as the diameter of the cone increases. The fluidized mass immediately above the cone will descend into the cone to the section where the gas velocity is sufficient to generally support the fluidized particles. In this section a segregation will occur, the larger particles continuing on downward since their ratio of mass to superficial surface is high enough so that these larger particles will fall against the rising gas stream, while the smaller particles are borne upward by this stream returning into the fluidized mass. Operating control over the degree and extent of particle separation with any given design of discharge cone may be obtained by varying the gas velocities in the cone by adjustment of the division of the gas flow between lines 37 and 35. Thus, more gases or less gases may be made to flow upward through the product discharge cone 41 by causing a corresponding lesser or greater flow of gases through the grid 28, the adjustment being obtained by means of valves 36 and 38. The larger particles, which were able to fall against the rising gas stream, collect in the bottom of the cone below the gas inlet, from which they may be discharged through line 50 as before mentioned.

In certain instances it may be preferable to charge the silica, alumina and/or iron oxide type of raw materials directly into reactor 26 without subjecting these materials to pretreatment. For this purpose line 62 and valve 63 are provided, by means of which such materials may be charged into line 25 to be carried directly into the fluidized mass 27 contained in reactor 26.

The operation of the process may be started as follows:

The pretreating reactor 2 is placed in operation by at first by-passing a part of the air or other oxygen containing gas stream, charged by compressor 4, through line 52 and valve 53 to provide primary gases to burner 8, charging fuel through line 54 and valve 55, igniting the burner, and thus heating the gases flowing into the bottom of reactor 2. Coarse "inert" particles are then charged into reactor 2 through line 56 and valve 57 to establish the fluidized mass and until the desired level is attained.

The temperature of the fluidized mass will gradually rise, and when sufficiently high to insure ignition (for instance 1000° F.) fuel may be charged directly into the fluidized mass through lines 10 and 12, and the temperature brought up to the desired operating temperature. The auxiliary burner operation may be discontinued by closing valves 53 and 55.

Meanwhile the cement forming reactor may be placed in operation in a similar manner by utilizing auxiliary burner 33 which is provided wtih a primary gas supply from compressor 29 through by-pass 58 and valve 59, and a fuel supply through line 60 and valve 61. Coarse cement product particles may be charged into reactor 26 through line 48 (which during continued operation serves for charging recycle product particles) to establish the initial fluidized mass.

When the fluidized mass 27 has reached ignition temperatures, fuel may be charged directly into the mass through lines 42 and 44, and the operation of auxiliary burner 33 may be discontinued by closing valves 59 and 61.

When the pretreating fluidized mass 1 and the cement forming fluidized mass 27 have both reached their desired operating temperatures, the charging of raw materials powder into reactor 2 may be started, followed by charging pretreated feed materials into reactor 26, and finally by withdrawal of product particles through line 50, the latter being obtained by adjusting the proper division of gas flow through lines 35 and 37. The process is now on stream and operating conditions may be adjusted gradually to obtain the desired capacity performance.

This application is a continuation-in-part of my prior application Serial No. 264,144, filed December 29, 1951, now abandoned.

Having thus described my invention and the manner in which the process may be started and the operating controls adjusted to obtain the most desirable performance of the process, what I claim is:

1. A process for the manufacture of hydraulic cement which comprises subjecting cement forming raw materials to pretreatment by charging said materials in finely powdered form into a pretreating reaction zone in which is established and maintained a fluidized mass of coarse particles consisting of materials which are inert to the pretreating reactions, maintaining the fluidized state of said mass by upward flow of oxygen containing gases through the mass at velocities which will maintain said coarse particles in a fluidized state while carrying the finely powdered pretreated raw materials particles from the fluidized mass in suspension in the gases discharging from the top of the mass, charging fuel into the mass which by combustion with the oxygen generates the heat necessary to maintain the mass at pretreating temperatures, separating the pretreated raw materials particles from the gases discharging from the mass, subjecting said separated pretreated raw materials particles to cement forming reaction conditions by charging same into a cement forming reaction zone in which is established and maintained a fluidized mass of coarse particles of cement product material, maintaining the fluidized state of the mass in said cement forming reaction zone by upward flow of oxygen containing gases through the mass, charging fuel into the cement forming fluidized mass which by combustion with the oxygen generates the heat necessary to maintain the mass at cement forming reaction temperatures, and discharging portions of said cement forming fluidized mass as final product of the process.

2. A process for the manufacture of hydraulic cement which comprises subjecting cement forming raw materials to pretreatment by charging said materials in finely powdered form into a pretreating reaction zone in which is established and maintained a fluidized mass of coarse particles consisting of materials which are inert to the pretreating reactions, maintaining the fluidized state of said mass by upward flow of oxygen containing gases through the mass at velocities which will maintain said coarse particles in a fluidized state while carrying the finely powdered pretreated raw materials particles from the fluidized mass in suspension in the gases discharging from the top of the mass and from said pretreating reaction zone, charging fuel into the mass which by combustion with the oxygen generates the heat necessary to maintain the mass at pretreating reaction temperatures, separating the pretreated raw materials particles from the gases discharging from said pretreating reaction zone, subjecting said separated pretreated raw materials particles to cement forming reaction conditions by charging same into a cement forming reaction zone in which is established and maintained a fluidized mass of coarse particles of cement product material, maintaining the fluidized state of the mass in said cement forming reaction zone by upward flow of oxygen containing gases through the mass, charging fuel into the cement forming fluidized mass which by combustion with the oxygen generates the heat necessary to maintain the mass at cement forming reaction temperatures, charging cement product particles into the cement forming fluidized mass of a particles size smaller than the average particle size of said mass, and discharging portions of said cement forming fluidized mass from said cement forming reaction zone as final product of the process.

3. A process for the manufacture of hydraulic cement which comprises subjecting cement forming raw materials to pretreatment by charging said materials in finely powdered form into a pretreating reaction zone in which is established and maintained a fluidized mass of coarse particles consisting of materials which are inert to the pretreating reactions, maintaining the fluidized state of said mass by upward flow of oxygen containing gases through the mass at velocities which will maintain said coarse particles in a fluidized state while carrying the finely powdered pretreated raw materials particles from the fluidized mass in suspension in the gases discharging from the top of the mass and form said pretreating reaction zone, charging fuel into the mass which by combustion with the oxygen generates the heat necessary to maintain the mass at pretreating temperatures, separating the pretreated raw materials particles from the gases discharging from said pretreating reaction zone, subjecting said separated pretreated raw materials particles to cement forming reaction conditions by charging same into a cement forming reaction zone in which is established and maintained a fluidized mass of coarse particles of cement product material, maintaining the fluidized state of the mass in said cement forming reaction zone by upward flow of oxygen containing gases through the mass, charging fuel into the cement forming fluidized mass which by combustion with the oxygen generates the heat necessary to maintain the mass at cement forming reaction temperatures, and withdrawing from said cement forming fluidized mass only coarser particles to be discharged as final product of the process while retaining in said mass the finer particles to subject said finer particles to continued reaction conditions.

4. The process for the manufacture of hydraulic cement from carbonate-containing raw feed materials, which comprises maintaining a fluidized mass of coarse particles which are inert to the raw feed materials at the temperatures of calcination of said raw feed materials, charging into said fluidized mass at least the carbonate content of the raw feed materials in finely-divided form, raising the temperature of the carbonate content of the raw feed materials while in said fluidized mass to the calcination temperature of such carbonate content, whereby calcination of the carbonate content of the raw feed materials is obtained, said fluidized mass being maintained in its fluidized state by upward flow of gas therethrough at velocities which will carry the finely-divided, pre-treated particles from the fluidized mass in suspension in the gas discharging from the top of the fluidized mass, separating the pre-treated raw material particles from the gases discharging from the fluidized mass, maintaining a mass of coarse particles of cement product by upward flow of a gas through a mass of such particles, charging raw cement-forming materials, including the calcined product of said pre-treating reaction, into said fluidized mass of coarse particles of cement product, raising the temperature of the raw cement-forming materials while in said fluidized mass of coarse cement product particles to the cement-forming reaction temperature, whereby said cement-forming raw materials react to form a cement product in said fluidized mass, and discharging portions of said fluidized mass as the final product of the process.

5. The process for the manufacture of hydraulic cement as set forth in claim 4, in which cement-product particles having an average particle size smaller than the average particle size of said mass of fluidized cement-product particles are charged into said mass of cement-product particles.

6. The process for the manufacture of hydraulic cement as set forth in claim 4 in which only the coarser particles are discharged from the mass of fluidized cement-product particles as the final product of the process, and the finer particles are retained in said fluidized mass to be subjected to continued reaction conditions.

References Cited in the file of this patent
UNITED STATES PATENTS

| | | |
|---|---|---|
| 2,469,989 | Pyzel | May 10, 1949 |
| 2,529,366 | Bauer | Nov. 7, 1950 |
| 2,638,684 | Jukkola | May 19, 1953 |
| 2,654,594 | Somogyi | Oct. 6, 1953 |
| 2,684,840 | Beheme et al. | July 27, 1954 |
| 2,738,182 | Thompson | Mar. 13, 1956 |
| 2,776,132 | Pyzel | Jan. 1, 1957 |